US012766346B2

(12) United States Patent
Jay

(10) Patent No.: US 12,766,346 B2
(45) Date of Patent: Oct. 20, 2026

(54) FILTER FACEMASK

(71) Applicant: John Mark Jay, South Lake Tahoe, CA (US)

(72) Inventor: John Mark Jay, South Lake Tahoe, CA (US)

( * ) Notice: Subject to any disclaimer, the term of this patent is extended or adjusted under 35 U.S.C. 154(b) by 0 days.

(21) Appl. No.: 19/339,301

(22) Filed: Sep. 25, 2025

(65) Prior Publication Data

US 2026/0091250 A1 Apr. 2, 2026

Related U.S. Application Data

(60) Provisional application No. 63/699,984, filed on Sep. 27, 2024.

(51) Int. Cl.
*A62B 23/02* (2006.01)
*A41D 13/11* (2006.01)
*A62B 18/08* (2006.01)
*A62B 18/10* (2006.01)

(52) U.S. Cl.
CPC .......... *A62B 23/02* (2013.01); *A41D 13/1107* (2013.01); *A62B 18/084* (2013.01); *A62B 18/10* (2013.01)

(58) Field of Classification Search
CPC ....... A62B 23/02; A62B 18/084; A62B 18/10; A62B 18/025; A62B 18/02; A62B 18/00; A62B 18/06; A41D 13/1107; A41D 13/11; A61M 16/06; A61M 16/00
See application file for complete search history.

(56) References Cited

U.S. PATENT DOCUMENTS

| | | | | |
|---|---|---|---|---|
| 4,414,973 A * | 11/1983 | Matheson | A62B 18/00 128/206.17 |
| RE43,289 E * | 4/2012 | Bowers | A62B 18/10 128/205.24 |
| 11,000,080 B1 * | 5/2021 | Hall | A41D 13/1107 |
| 2006/0254592 A1 * | 11/2006 | Anders | A62B 18/084 128/206.28 |
| 2012/0247474 A1 * | 10/2012 | Torbenson | A62B 18/10 128/206.15 |
| 2021/0086005 A1 * | 3/2021 | O'Brien | A61P 19/00 |

FOREIGN PATENT DOCUMENTS

| | | | | |
|---|---|---|---|---|
| KR | 101826466 B1 * | 2/2018 | A62B 23/02 |
| WO | WO-2021247087 A1 * | 12/2021 | A62B 18/025 |
| WO | WO-2022087521 A1 * | 4/2022 | A62B 18/086 |

* cited by examiner

*Primary Examiner* — Tarla R Patel
(74) *Attorney, Agent, or Firm* — David E. Olsen

(57) ABSTRACT

A facemask apparatus is provided comprising a sealing layer of flexible, non-porous material sized to cover a wearer's nose and mouth, the sealing layer including an input aperture and an output aperture. An input valve is disposed over the input aperture to permit airflow toward the wearer while blocking reverse flow, and an output valve is disposed over the output aperture to permit exhaled airflow away from the wearer while blocking reverse flow. A stretchable fabric portion supports the sealing layer, defines a second set of apertures, and includes coupling features to secure a headband. A filter is positioned on the distal side of the fabric over the second input aperture to further condition inhaled air. In related embodiments, methods of facilitating inhalation and exhalation through the valves and filter are provided, thereby improving sealing, comfort, and filtration efficiency for respiratory protection.

17 Claims, 5 Drawing Sheets

2000

FILTER FACEMASK

CROSS-REFERENCE TO RELATED APPLICATION(S)

This application claims priority from U.S. Provisional Patent Application Ser. No. 63/699,984, filed on Sep. 27, 2024, which is hereby incorporated by reference herein in its entirety, including all references and appendices cited therein, for all purposes.

BACKGROUND

Field of the Invention

The present disclosure relates generally to personal protective equipment and, more particularly, to a filtering facemask designed to reduce exposure to airborne particulates, pathogens, and other contaminants.

Description of Related Art

Face masks have long been employed in industrial, medical, and consumer settings to provide a barrier between the wearer and airborne contaminants. Conventional masks, such as disposable surgical masks, typically rely on a multilayer fabric structure to capture particles through mechanical and electrostatic filtration. Respirators, including N95-type masks, incorporate higher-grade filter media capable of removing at least 95% of airborne particles under specified testing conditions.

While these masks provide some level of protection, several shortcomings remain. Many conventional masks suffer from limited breathability, which reduces comfort and discourages prolonged use. Fit and seal are also common concerns, as gaps between the mask and the wearer's face can permit unfiltered air to bypass the filtration media. Additionally, prolonged use of masks can lead to the accumulation of moisture, odors, and microbial growth, further diminishing performance and user compliance.

During public health crises, such as pandemics caused by airborne pathogens, the demand for effective face masks increases sharply. However, existing designs are not always optimized for both high filtration efficiency and long-term comfort. Additionally, the increase in large fire events, such as forest fires, can expose people to airborne particles. Furthermore, masks that are reusable often require complex cleaning or replacement of filter components, which may discourage proper use.

Accordingly, there remains a need for improved filtering facemasks that combine effective particulate removal with enhanced comfort, secure fit, and ease of use.

SUMMARY

The invention relates to a facemask apparatus that includes a sealing layer formed from a non-porous sealing layer material sized to cover the wearer's nose and mouth. This sheet contains an input air aperture and an output air aperture, each overlaid by respective input and output valves. The input valve allows airflow from its distal side to its proximal side while blocking reverse flow, and the output valve permits airflow from its proximal side to its distal side while preventing backflow. A stretchable fabric is coupled to the sealing layer and includes a mechanism for attaching a headband to secure the mask in place. A filter is connected to the distal side of the sealing layer to overlay the input air aperture, providing filtration of inhaled air.

The stretchable fabric may further include additional apertures, such as a second input and output air aperture, and may be formed from a fabric that is stretchable and breathable. The sealing layer may be made of a silicone-encapsulated polyester fabric, optionally incorporating a silicone sealing structure around its periphery to improve fit and sealing. The filter may be removable and replaceable, such as a HEPA filter. The input and output valves may include risers or pillars on their proximal sides to hold portions of the sealing layer away from the face, and they may also include diaphragms as a means of providing directional airflow. In some embodiments, the input valve operates as a vacuum relief valve while the output valve operates as a pressure relief valve. Additional optional features include VELCRO elements positioned to tighten the mask under the chin, a compressible nose seal coupled to the top of the sealing layer, and a bandana attached to the distal side of the stretchable fabric.

The invention also encompasses methods of making the filter facemask apparatus. The method includes providing the sealing layer sheet with apertures, attaching input and output valves, coupling the stretchable fabric to the sealing sheet, and attaching a filter to the input valve's distal side. Variations of the method may involve forming additional apertures in the stretchable fabric, constructing the sealing sheet from silicone-encapsulated polyester, applying a peripheral silicone sealing means, or incorporating a removable HEPA filter. The valves may include risers and diaphragms and function as vacuum or pressure relief valves. The method may also include attaching a headband with two ends secured to the stretchable fabric to hold the mask securely in place.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure and explain various principles and advantages of those embodiments.

The apparatuses and methods disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

The present disclosure relates generally to facial coverings that provide filtering of inhaled air and discharge the exhaled air through an alternative pathway that prevents moisture from building up in the filtering component of the system. The terms face mask and facemask are used interchangeably in that embodiments of the invention can cover the entire face or just the nose and mouth.

For the purpose of the description of the inventive embodiments, the use of the term "proximal" means toward or a side towards the wearer's face of the facemask. The term "distal" indicates away or a side away from the wearer's face of the facemask.

Figure 1A:
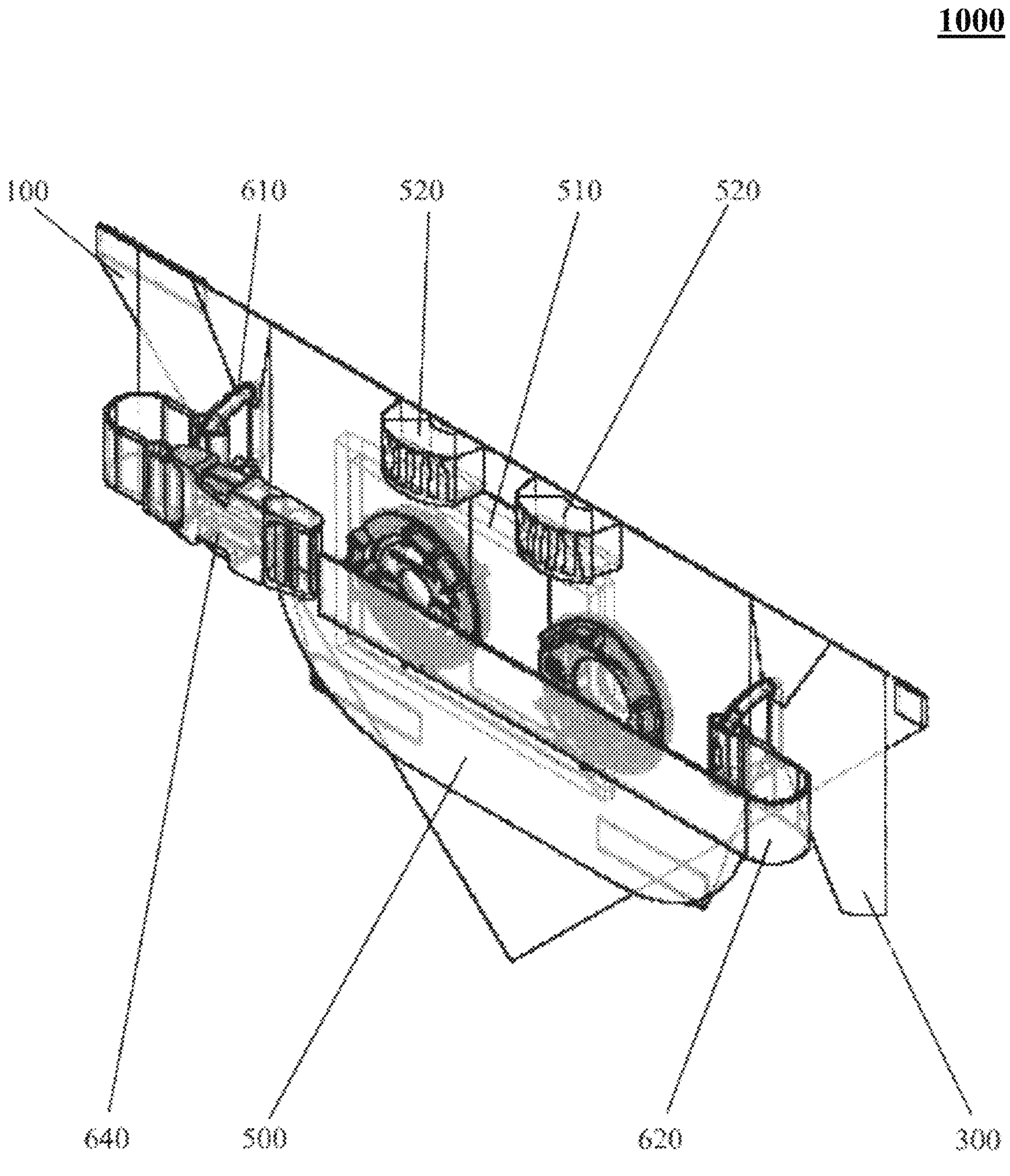
FIG. 1A is a perspective view of the proximal side of one embodiment of the filter facemask.

Referring to FIG. 1A, the figure shows a proximal perspective view of the facemask 1000. The most distal component, the farthest from the face, is the bandana 100. The bandana 100 can be made from a breathable cloth material. Preferably, the material color can be chosen for different purposes. These can include the wearing of the mask being aesthetically pleasing or stylish to encourage a person to wear the mask and prevent the person wearing the mask from appearing too odd. The color can be selected to improve the visibility of the person wearing the facemask for safety purposes. Further, the bandana 100 can be removed for cleaning. The bandana 100 can be attached (not shown) to an adjacent stretchable fabric 300 layer, a sealing layer 500, or a headband 620 by clips, VELCRO, snaps, hooks, or some other detachable means. The use of the term VELCRO refers to a hook-and-loop fastening system that includes a first fastening strip having a plurality of resilient hooks and a second fastening strip having a plurality of loops. When the hooks engage the loops, the fastening strips are releasably secured together.

The next layer distal to the bandana 100 is a stretchable fabric 300. The stretchable fabric 300 is used to pull the facemask 1000 securely to a wearer's face. The stretchable fabric 300 is preferably positioned between the bandana 100 and the sealing layer 500. The stretchable fabric 300 can include a means to couple a headband 620 to the stretchable fabric 300. In the embodiment shown in FIG. 1A, the ends of the stretchable fabric are tapered to restrain a D-ring 610 to the stretchable fabric 300 while being tightened across a wearer's face. However, other means of coupling the headband 620 to the stretchable fabric 300 are contemplated, including but not limited to hooks, sewing, glue, snaps, VELCRO® and heat fusing. The headband 620 can be made from a flexible or non-flexible material. The headband 620 can include a buckle 640 for easy application of the facemask 1000.

The sealing layer 300 includes two apertures (hidden by the air input and output valves 420, 430) for air ingress and air egress as a result of breathing by a wearer of the facemask 1000. Preferably, the two apertures, the air input aperture and the air output aperture, are substantially aligned with the air input valve 430 and the air output valve 420. The two apertures can be the same size as the air input and output valves 430, 420, or can be smaller. Alternatively, a single aperture can be used (not shown) with a single valve with both an air ingress and egress diaphragm and a path for moving the exhaled air away from the filter. This path can include the exhaled air passing through the stretchable fabric.

The stretchable fabric 300 can be formed from one or more materials. These include Elastane, a stretchable and breathable fabric, Nylon, Mesh, Neoprene Rubber, Jersey, Lycra, Tulle, Viscose Jacquard, and wool.

Figure 3:
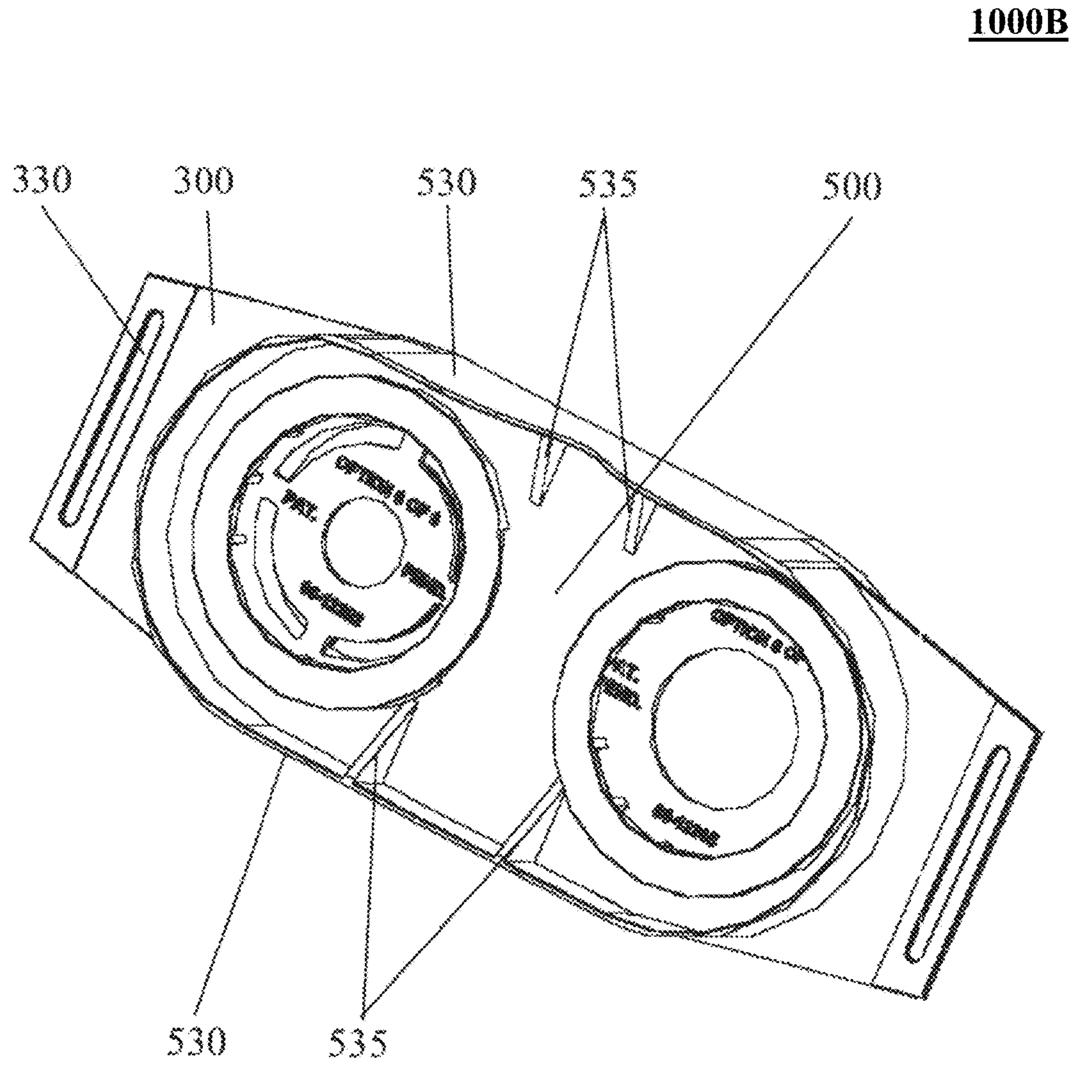
FIG. 3 is an alternative embodiment of the filter facemask.

The next layer on the proximal side of the stretchable fabric 300 is a sealing layer. The sealing layer comprises a sealing layer 500 formed from a substantially non-porous material. When a facemask wearer inhales, a small vacuum is generated, causing the sealing layer to seal against the facemask wearer's face. The sealing layer can include a sealing means extending around the perimeter of the sealing layer's distal side. The sealing means can be a bead of silicone or a skirt around all or part of the perimeter of the sealing layer. This skirt is shown in FIG. 3-530.

Figure 1B:
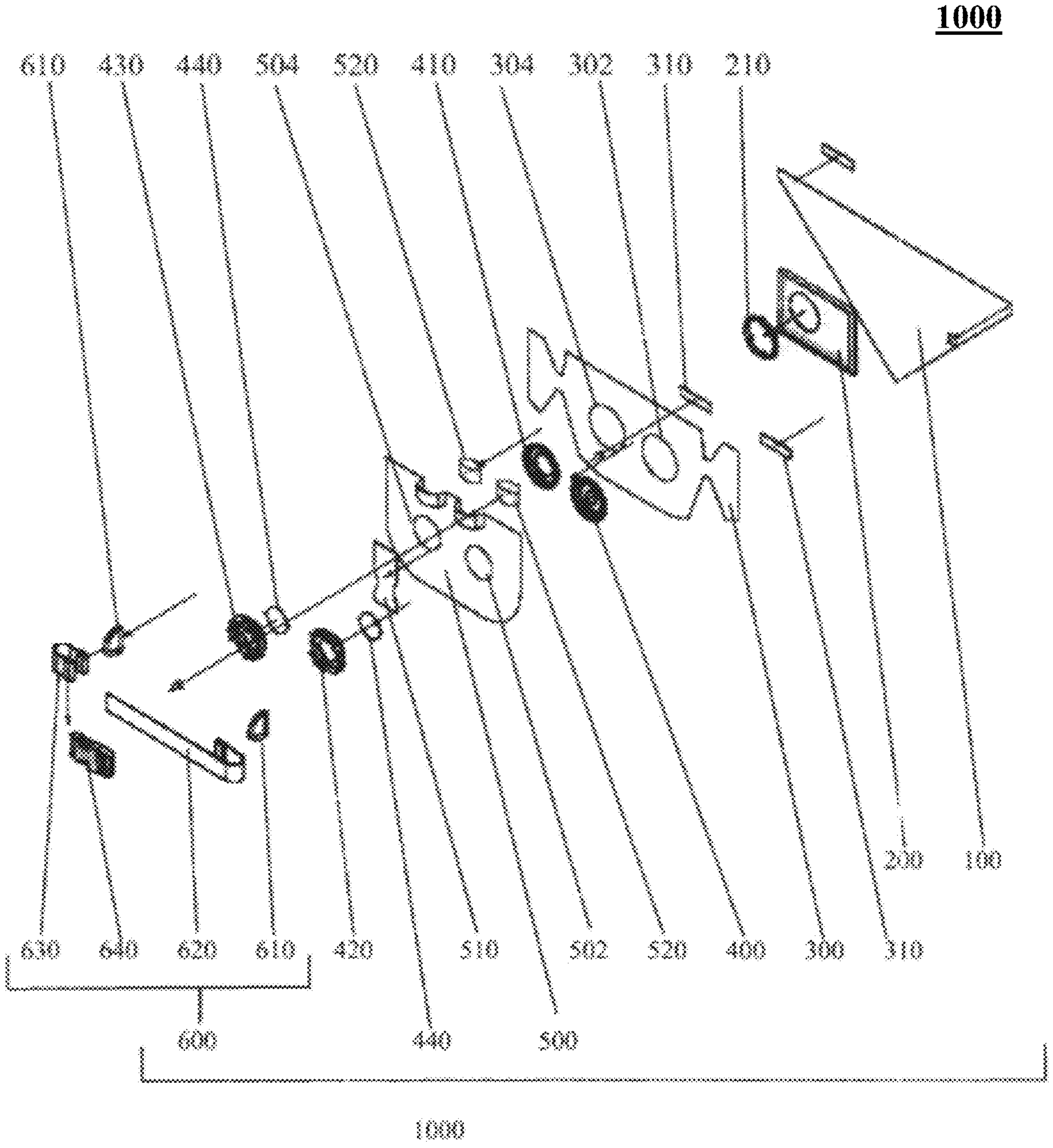
FIG. 1B is an exploded view of the components of the filter facemask of FIG. 1A.

The sealing layer 500 includes two apertures 502, 504-FIG. 1B to which an air input valve 430-FIG. 1B and air output valve 420-FIG. 1B is a coupled. In the shown embodiment, the air input valve 430 and air output valve 420 are round, but other shapes are contemplated. Preferably, the air input valve 430 and air output valve 420 are sealed to the sealing layer 500 and thereby prevent ingress or egress of the wearer's breath from escaping around the air input and air output valve.

The facemask 1000 can include a nose seal 520 that improves the seal between the facemask 1000 and the wearer's nose. The sealing layer 500 can be shaped to accept the shape of the nose seal 520. Additionally, the nose seals 520 helps prevent the facemask 1000 from sliding off the wearer's face.

Referring to FIG. 1B, the figure shows an exploded view of the facemask components of one embodiment of the invention. Described from the most distal component to the proximal components, the facemask's 1000 major components are a bandana 100, a filtering means 200, a stretchable fabric 300 coupled to a scaling layer 500.

The most distal component, the bandana 100 is described above. Additionally, the bandana can be a square cloth folded diagonally. However, other shaped cloths are contemplated.

The filtering means 200 can include a circular clip 210 for coupling the filtering means 200 to the air filter 410. The High Efficiency Particulate Air (HEPA) filtering means can be of any shape and size to support airflow for breathing. The filtering means can be made from a fabric or fiber that filters out particles down to micron sizes for HEPA filtration. The filter can include activated carbon for removing undesirable chemicals. A Person of Ordinary Skill in the Art (POSITA) of manufacturing air filters would know how to manufacture an air filter with the desired filtering characteristics. Further, the filtering means 200 can be removable, exchangeable, and cleanable.

The next component proximal to the air filter 200 is the stretchable fabric 300. The stretchable fabric 300 as described above for FIG. 1A. The stretchable fabric 300 can include two VELCRO® tabs 310 attached towards the bottom of the stretchable fabric 300 and is used to cinch the facemask under the wearer's chin and provide a better seal of the facemask 1000 to the wearer's face.

Distally located adjacent to the stretchable fabric 300 is the sealing layer 500. The sealing layer 500 provides a sealing layer that is comprised of a sealing layer 500 formed from a substantially non-porous material.

Coupled through the two apertures 504, 502 in the sealing layer 500 are an air input valve (430, 440A, and 410) and an air output valve (420, 440B, and 400). The air input valve includes an input valve proximal component 430, an input distal component 410, and an input valve diaphragm 440A that lets the air ingress when the wearer is inhaling and blocks the air from the wearer's exhale. The input valve proximal component 430 and input valve distal component 410 can fit together and form a coupling and seal with the sealing layer 500.

The air output valve includes an output valve proximal component 420, an output distal component 400, and an output valve diaphragm 440B that lets the air egress when the wearer is exhaling and blocks the air from the wearer's inhale. The output valve proximal component 420 and output valve distal component 400 can fit together and form a coupling and seal with the sealing layer 500.

As discussed previously, these apertures are preferably round but can be any shape. However, the shape needs to match the shape of an air input valve 410, 430, 440, and an air output valve 400, 420, 440 to allow for a seal to be performed between the air output valve and the sealing layer around the two apertures, the input air aperture 504, and the output air aperture 502. Preferably, the sealing layer 500 is made from a non-porous material that is impermeable to air and water. Further, the sealing layer 500 can include means 310 to tighten the mask around the chin. These tightening means can include, but are not limited to, VELCRO®, a strap, hooks, and snaps.

As discussed above, the filter facemask 1000 can include a headband 620 that can include a latch 640 and is coupled to the stretchable sheet 300 with a D-ring 610. The facemask's scaling layer includes a sealing layer 500 with two apertures 504 and 502.

Figure 2:
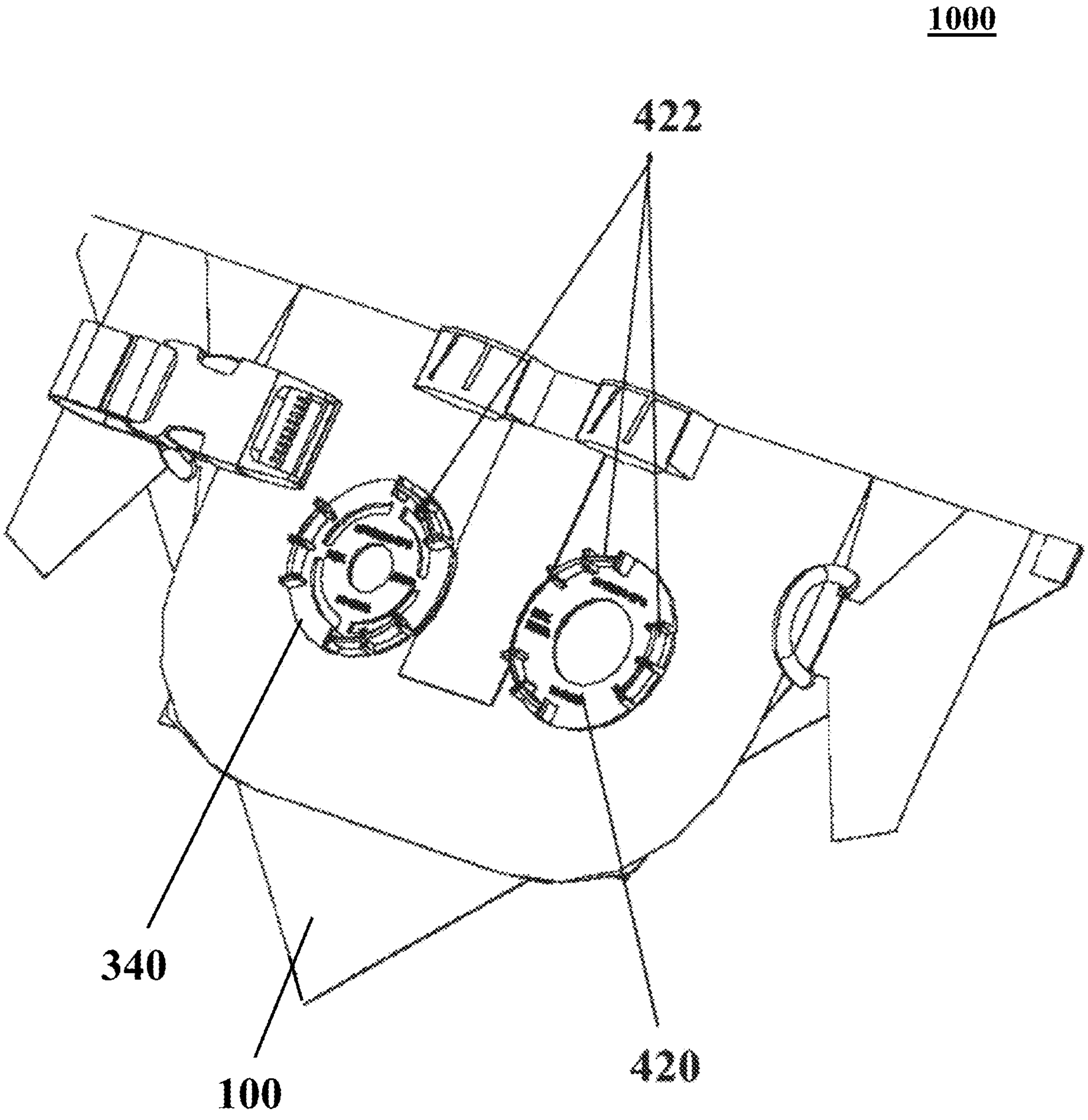
FIG. 2 is a blown-up view of an air ingress and air egress valve, showing the pillars displacing the sealing sheet from a wearer's face.

Referring to FIG. 2, is a perspective enlarged view of the air input valve 420. This valve structure includes pillars, risers, or supports 422 that hold the valve and the sealing layer 400 away from a wearer's face, thus enabling airflow to and from the wearer's mouth or nose to the air input valve and air output valve.

Referring to FIG. 3, an alternative embodiment of the filter facemask 1000B is shown. In this embodiment, the sealing layer 500 includes a skirt 530 around the periphery of the sealing layer 500 to provide a more reliable seal between the facemask 1000B and a wearer's face. Further, by providing a skirt 530, the stretchable fabric 300 does not have to be pulled as tightly to the face to get a reliable seal and thus increases the wearing comfort. To provide rigidity to the skirt 530, multiple supports 535 can be provided within the inside perimeter of the skirt 530. In a further embodiment, the skirt 530 can be a bead of silicone (not shown) running along the inside perimeter of the sealing layer's 500 proximal side.

Figure 4:
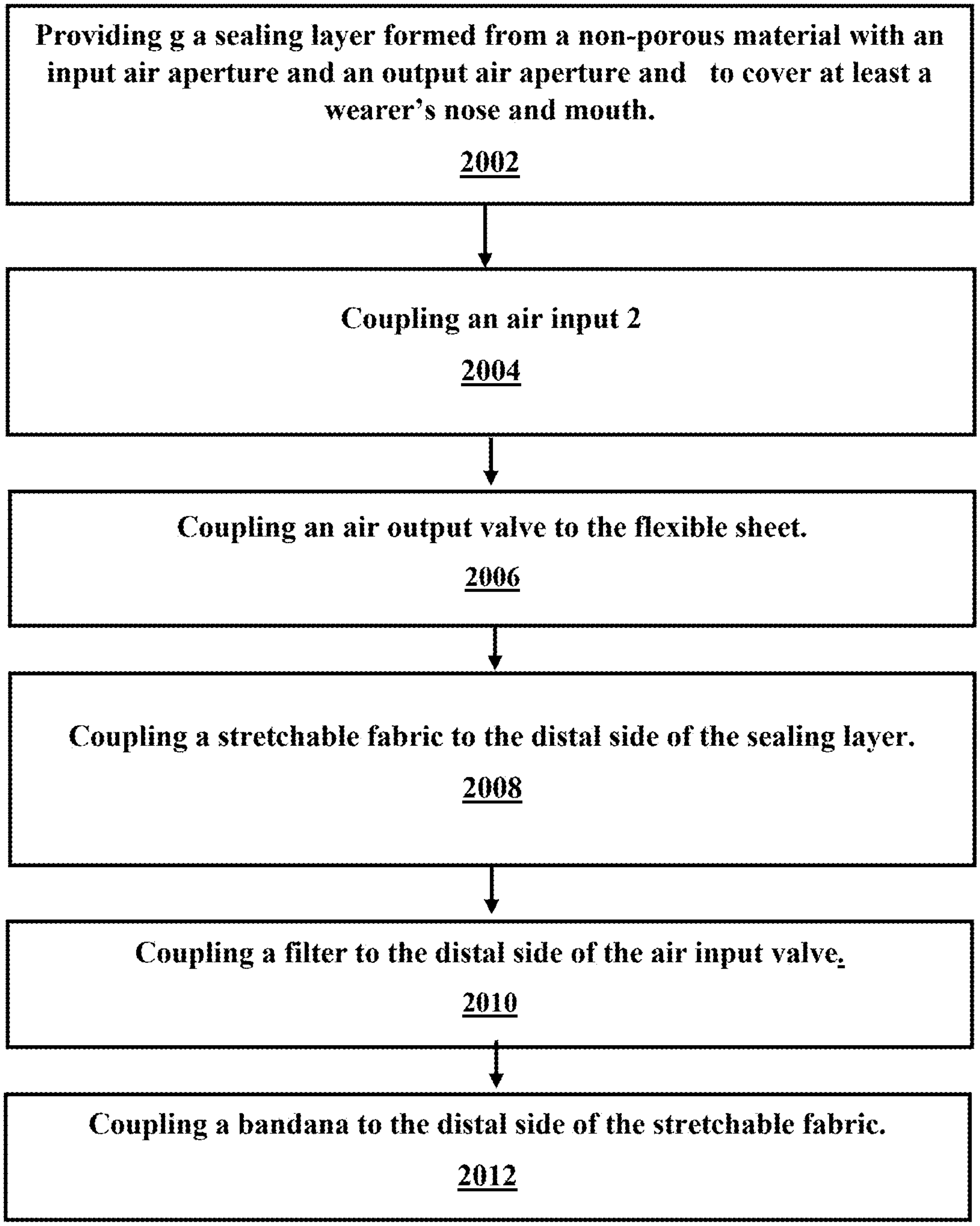
FIG. 4 is a flow diagram of an exemplary method for manufacturing a facemask.

Referring to FIG. 4, an exemplary method 2000 for making a facemask is shown and described. In step 2002, a sealing layer is formed and sized to cover a wearer's nose and mouth. The sealing layer can have two apertures, an air input aperture and an air output aperture, sized to couple an air input valve and an air output valve. The sealing layer should be formed from a material that is non-porous to air, including but not limited to a polyester fabric encased in silicone.

The sealing layer can provide the sealing means in itself or can include a sealing means along the proximal periphery of the sealing layer. This sealing means, along the proximal periphery of the sealing layer, can include a silicone bead or a skirt running around all or a portion of the sealing layer periphery. The skirt can include multiple supports along the inner periphery of the skirt. The supports can be formed from silicone, but other materials are contemplated. In one embodiment, the supports are tapered buttresses.

In a step 2004, an air input valve is coupled to the sealing layer. The air input valve can consist of two pieces that snap together, forming a seal with the sealing layer. Other methods of coupling can be used, including, but not limited to, gluing and heat fusing.

The air input valve can include a diaphragm that enables air flow in the proximal direction and stops or inhibits air flow in the distal direction. Further, the air input valve can include pillars or columns that hold a portion of the structure away from the air input valve base and result in holding the sealing layer away from portions of the wearer's face. A POSITA in the field of designing and selecting air valves would be able to design or select an air valve that would be suitable for a filter facemask.

In a step 2006, an air output valve is coupled to the sealing layer. The air output valve can consist of two pieces that snap together, forming a seal with the sealing layer. Other methods of coupling can be used, including, but not limited to, gluing and heat fusing.

The air output valve can include a diaphragm that enables air flow in the distal direction and stops or inhibits air flow in the proximal direction. Further, the air output valve can include pillars or columns that hold a portion of the valve structure away from the air output valve base, resulting in holding the scaling layer away from portions of the wearer's face. A POSITA in the field of designing and selecting air valves would be able to design or select an air valve that would be suitable for an air output valve for a filter facemask.

In a step 2008, a stretchable fabric is provided and coupled with the sealing layer. The stretchable fabric is preferably permeable to air and water vapor. If the stretchable fabric does not include a second air output aperture, it will be beneficial for the wearer to be able to exhale through the stretchable fabric. In one embodiment, the stretchable fabric is modified or manufactured to have a second air input aperture, a second air output aperture, or both. The stretchable fabric can be made from other stretchable, breathable materials.

The stretchable material includes a means for coupling the proximal side of the stretchable material to the distal side of the sealing means. The coupling can be provided by removable means, including, but not limited to, VELCRO®, clips, snaps, and hooks. Non-removable means includes, but is not limited to glue.

The stretchable material includes a means to couple a headband. In one embodiment, the stretchable material includes tapered cars over which D-rings can be looped. In another embodiment, slits are formed on each side of the stretchable fabric through which headband straps can be attached.

In a step 2010, a filter is coupled to the distal side of the air input valve. The filter can include a filter ring configured to engage with the distal side of the air input valve. The filter engages with the distal side of the air input filter by a pressure fit, snapping together, or screwing together. The filter can be a HEPA filter.

In a step 2012, a bandana is acquired and coupled to the distal side of the stretchable fabric. The coupling can be achieved with, but not limited to, VELCRO, snaps or hooks.

Operational Principle

In reference to FIGS. 1A and 1B, the sealing layer 500-FIG. 1B forms an excellent seal and barrier when drawn against a face by a negative pressure differential. The principle is similar to when a plastic sheet is placed on your face, covering your mouth and nose as you inhale. A flexible sealing layer will form a seal against a face that has infinitely variable facial characteristics.

To further assist creation of a seal, a stretchable fabric or stretchable and breathable fabric 300-FIG. 1B is placed on the distal side of the sealing layer 500. To either side of the top of the nose, just below eyeglass level, compressible foam (see 520-FIG. 1B) can be inserted between the sealing layer and the stretchable fabric. When the tension is applied to the stretchable fabric, like stockings/leggings/running tights, the stretchable fabric causes everything to conform to the surface beneath it.

In the shown embodiment, D-Rings 610-FIG. 1B are connected to each side of the stretchable fabric. When the straps (see 620, 630-FIG. 1B) are pulled together, since the sealing layer cannot stretch, the D-rings slide across the sealing layer while the other side of the sealing layer applies tension to the stretchable fabric.

To complete the seal, a hook side VELCRO and a loop side VELCRO 310-FIG. 1B are attached (sewn) to the left and right of the sealing layer 500 below the chin. One Velcro side is fully attached, while the mating VELCRO side is not fully attached, but rather attached just to keep it in position. The "loose" VELCRO side is then pulled to the fully attached VELCRO side as necessary to form a seal along the chin, completing a seal of the sealing layer 500 to a wearer's face.

The air input valve (FIG. 1B-410, 430, 440) and the air output valve (FIG. 1B-400, 420, 440) are similar but function in opposite directions. When inhaling, the air input valve opens by opening the diaphragm (FIG. 1B-440), as result of a pressure differential, to the open position and drawing in air through user-selectable grade (e.g. HEPA, N95, Merv 1-16) of filter (FIG. 1B-200) while the air output valve closes by the pressure differential across the sealing layer pulling the diaphragm into a close position and thereby preventing dirty ambient air from being drawn in. On exhalation, the air input valve closes from the pressure on the proximal side of the valve being greater than the pressure on the distal side and thus preventing moist exhaled air from contaminating the filter 200, while the air output valve opens. Moist exhaled air is vented as opposed to being trapped within the mask interior zone or affecting the performance of the filter 200. Not readily discernible is that a raised circular ring is on each side of the diaphragm to allow the creation of a line of contact for effective sealing and the minimization of "stiction."

Finally, a bandanna (FIG. 1B-100) is attached in front of the filter facemask assembly for both an aesthetically pleasing look and to prevent the exhaled air from potentially being blown into a person in front of the mask wearer.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed:

1. A facemask apparatus, comprising:

a sealing layer formed from a non-porous material, the sealing layer including an input air aperture and an output air aperture, and the sealing layer sized to cover at least a wearer's nose and mouth;

an air input valve comprising a diaphragm and a riser on the proximal side to hold the sealing layer away from a wearer's face, the air input valve coupled to the sealing layer and substantially overlying the input air aperture configured to pass air from the air input valve's distal side to the air input valve's proximal side and block air flow from the air input valve's proximal side to the air input valve's distal side;

an air output valve coupled to the sealing layer and substantially overlying the output air aperture and configured to pass air from the air output valve's proximal side to the air output valve's distal side and block air flow from the air output valve's distal side to the air output valve's proximal side;

a stretchable fabric coupled to the sealing layer, the stretchable fabric including one or more headband attachment structures configured to receive and secure opposite ends of a headband to hold the facemask on a wearer's face; and a filter connected to the sealing layer distal side and substantially overlaying the input air aperture.

2. The apparatus of claim 1, wherein the stretchable fabric includes a second input air aperture and a second output air aperture.

3. The apparatus of claim 1, wherein the sealing layer is a silicone encapsulated polyester fabric.

4. The apparatus of claim 1, wherein the sealing layer further includes a silicone sealing means around the periphery of the sealing layer.

5. The apparatus of claim 1, wherein the filter is a removable and replaceable HEPA filter.

6. The apparatus of claim 1, wherein the stretchable fabric is also breathable.

7. The apparatus of claim 1, wherein the air input valve is a vacuum relief valve, and the air output valve is a pressure relief valve.

8. The apparatus of claim 1, further comprising a hook-and-loop fastening system connected to the sealing layer and positioned to selectively draw opposing portions of the sealing layer toward one another beneath the wearer's chin to improve a seal between the sealing layer and the wearer's face.

9. The apparatus of claim 1, further comprising a nose seal, wherein the nose seal comprises a compressible or flexible material coupled to the top of the sealing layer.

10. The apparatus of claim 1, further comprising a bandana coupled to the distal side of the stretchable fabric.

11. A method of making a facemask apparatus, comprising:

providing a sealing layer formed from a non-porous material, the sealing layer including an input air aperture and an output air aperture, and the sealing layer sized to cover at least a wearer's face, nose, and mouth;

coupling an air input valve to the sealing layer, and thereby substantially overlying, the input air aperture configured to pass air from the air input valve's distal side to the air input valve's proximal side and block air flow from the air input valve's proximal side to the air input valve's distal side, wherein the air input valve comprises an air input diaphragm and an air input valve riser on the proximal side, the input valve riser configured to hold a portion of the sealing layer away from a wearer's face;

coupling an air output valve to the sealing layer and substantially overlying the output air aperture, the air output valve configured to pass air from the air output valve's proximal side to the air output valve's distal side and block air flow from the air output valve's distal side to the air output valve's proximal side, wherein the air output valve comprises an air output diaphragm and an output valve riser on the proximal side, the air output valve riser configured to hold a portion of the sealing layer away from a wearer's face;

coupling a stretchable fabric to the sealing layer, the stretchable fabric including one or more headband attachment structures configured to receive and secure opposite ends of a headband; and coupling a filter to the distal side of the air input valve.

12. The method of claim 11, further comprising the step of forming a second input air aperture and a second output air aperture in the stretchable fabric.

13. The method of claim 11, wherein the sealing layer is a silicone encapsulate polyester fabric.

14. The apparatus of claim 13, further comprising forming a silicone skirt extending around at least a portion of the periphery of the sealing layer, the silicone skirt being configured to improve sealing between the sealing layer and the wearer's face.

15. The method of claim 11, wherein the filter is a removable and replaceable HEPA filter.

16. The method of claim 11, wherein the air input valve is a vacuum relief valve, and the air output valve is a pressure relief valve.

17. The method of claim 11, further comprising the step of attaching a headband having two ends, each of the ends coupled to the stretchable fabric.

* * * * *